Jan. 30, 1934. W. J. COULTAS 1,945,364
CORN PICKER
Filed Jan. 23, 1931
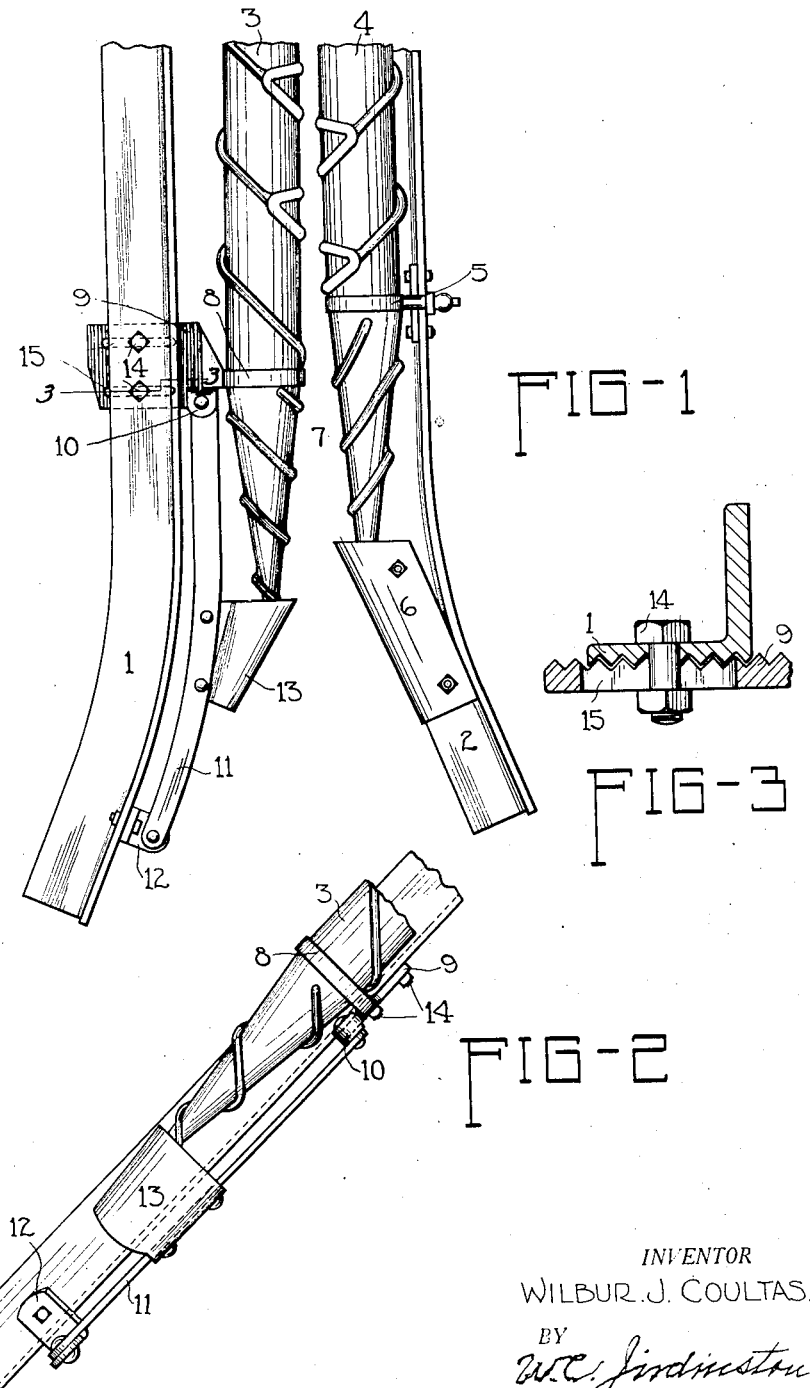
INVENTOR
WILBUR J. COULTAS.
BY
W. C. Jirdinstrn
ATTORNEY
WITNESS
Walter Ackerman Patented Jan. 30, 1934

1,945,364

UNITED STATES PATENT OFFICE 1,945,364

CORN PICKER

Wilbur J. Coultas, Moline, Ill., assignor to Deere & Company, Moline, Ill., a corporation of Illinois Application January 23, 1931. Serial No. 510,728

10 Claims. (Cl. 56—104)

My invention relates to corn harvesters and particularly to that type commonly known as corn pickers or huskers in which one of the rolls is adjustable relative to the other roll, both of said rolls having shields to protect their forward ends and also to deflect the stalks toward the rolls and at the same time prevent plant leaves, vines and other weeds from accumulating on the forward ends of the rolls.

The object of my invention is to provide a simple and effective and inexpensive means by which the shield covering the adjustable roll can be simultaneously adjusted therewith.

Referring to the drawing in which similar numerals indicate identical parts—

Figure 1 is a plan view of part of the gathering frame of a corn picker illustrating my invention and its application;

Figure 2 is a side elevation of part of Figure 1 further illustrating my invention and the manner in which it is mounted; and, Figure 3 is a detail section showing more fully the mounting of part of my invention.

The part of the frame shown consists of bars 1 and 2 which support the gathering mechanism including the picker rolls 3 and 4. The bars 1 and 2 diverge forwardly, as usual, to gather the stalks of corn to the rolls 3 and 4. The roll 4 is not adjustable and is supported in a bearing 5 on the frame bar 2, and forward of the conical end of the roll is a shield or fender 6 mounted on the frame bar 2 and inclining toward the passageway 7 through which the cornstalks travel. The roll 3 is similar to roll 4 but its conical termination is located further forward, and at the junction thereof to the main body of the roll the roll is supported in a bearing 8 forming part of a horizontal bracket 9 secured to the frame bar 1 as hereinafter explained. On the conical ends of the rolls are spirals which extend from the bearings to the ends of the rolls to aid delivery of the stalks of corn to the picker part of the rolls.

To a projection 10 on the bracket 9 is pivotally attached a link 11 which extends forwardly to a bracket 12 rigidly secured on the bar 1 and to which the link is pivotally attached. Riveted to the link 11 is a shield or fender 13 operating to cover the point of the roll, and the forward part of the spiral thereon and inclined toward the passageway 7, both of said shields cooperating in a proper guidance of stalks to the picker rolls. The body of the bracket 9 is flat and the upper surface is serrated to engage with a similar serrated under surface of the bar 1. Bolts 14 extend through the bar 1 and through parallel slots 15 in the flat of the bracket 9, nuts on the bolts hold the parts together.

Heretofore in picker construction while one of the rolls was adjustable the shield or fender covering the forward end of that roll remained in a fixed position, consequently the entrance for stalks between the shields and the passage between the rolls did not vary. This construction was detrimental to the most efficient operation of the machine, and I have remedied the condition by my invention by which the shield of the adjustable roll is adjusted simultaneously with the roll itself, and this adjustment is effected by loosening the nuts on the bolts 14 sufficiently to separate the serrated surfaces of the bracket 9 and the bar 1, the bracket can then be moved to right or left until the desired adjustment is made, after which the nuts are again tightened to secure the parts rigidly together.

It is very evident that as the roll 3 is supported on the bracket it is adjusted toward or from the opposite roll, and as the link 11 is attached to the bracket and the shield 13 is mounted on the link it follows that with any adjustment of the bracket 9 the roll 3 and shield 13 are simultaneously adjusted without changing their positions relative to each other.

What I claim is—

1. In a corn picker, the combination of frame members, picker rolls supported on said members, fenders covering the forward ends of the rolls, and means to adjust one of said rolls and adjacent fender laterally relative to the opposite roll and fender.

2. In a corn picker, the combination of frame members, picker rolls supported on said members, fenders covering the forward ends of the rolls, and means to simultaneously adjust one of said rolls and adjacent fender toward or from the opposite roll and fender.

3. In a corn picker, the combination of frame members, bearings on the members, picker rolls supported in said bearings, fenders covering the forward ends of the rolls and inclined toward each other and the passage between the rolls, and means operative to adjust one of said rolls and adjacent fender simultaneously toward or from the opposite roll and fender.

4. In a corn picker, the combination of frame members, brackets including bearings mounted on said members, picker rolls supported in the bearings, one of said brackets adjustable to vary the position of the roll thereon relative to the other roll, a supporting element pivotally attached to the adjustable bracket and extending forwardly to pivotal connection with the adjacent frame member, fenders protecting the forward ends of the rolls, the fender of the adjustable roll rigidly secured to said element whereby the roll and fender are adjusted simultaneously.

5. In a corn picker, the combination of frame members having rear parallel portions and forward divergent portions, brackets including bearings mounted on the rear portions, picker rolls supported in the bearings, one of said brackets adjustable to vary the position of the roll thereon relative to the opposite roll, a supporting element pivotally attached to the adjustable bracket and extending forwardly to pivotal attachment to the adjacent frame member and parallel therewith, fenders protecting the forward ends of the rolls, the fender of the adjustable roll rigidly secured to said element whereby the roll and fender are adjusted simultaneously toward the opposite roll and fender by operation of the adjustable bracket.

6. In a corn picker, the combination of parallel frame members having rearwardly extending portions and forwardly divergent portions, brackets including bearings mounted on the rear portions, picker rolls supported in said bearings, one of said brackets adjustable to vary the position of the roll thereon relative to the opposite roll, a supporting element pivotally attached to the adjustable bracket extending forwardly parallel therewith and pivotally attached to the diverging portion of the adjacent frame member, fenders protecting the forward ends of the rolls, the fender of the adjustable roll rigidly mounted on said element, said adjustable bracket and element cooperating in a simultaneous adjustment of the adjustable roll and fender toward or from the opposite roll and fender.

7. In a corn picker, the combination of frame members, picker rolls supported on said members, spirals on said rolls extending to the forward ends thereof, and fenders rearwardly inclined toward each other and covering the forward ends of the rolls and of the spirals thereon.

8. In a corn picker, the combination of frame members, picker rolls supported on said members, spirals on said rolls extending to the forward ends thereof, and fenders supported on said members forwardly of the ends of the rolls and extending rearwardly over said ends to operate as covers therefor and for the forward ends of the spirals thereon.

9. In a corn picker, the combination of frame members, brackets including bearings mounted on said members, picking rolls supported in said bearings, one of said brackets being adjustable to vary the position of the roll thereon relative to the other roll, fenders protecting the forward ends of the rolls, a supporting element to which the fender of the adjustable roll is secured, said supporting element being connected with the adjustable bracket through which connection the supporting element with the fender secured thereon is adjusted simultaneously with the adjustable bracket.

10. In a corn picker, the combination of frame members, brackets including bearings mounted on said members, picking rolls supported in said bearings, said rolls having tapered points extending forwardly from said bearings, one of said brackets being adjustable to vary the position of the roll thereon relative to the other roll, fenders protecting the forward ends of the rolls, a supporting element to which the fender of the adjustable roll is secured, said supporting element having a portion extending rearwardly, the rearward end of said rearwardly extending portion being connected with said adjustable bracket, through which connection the supporting element with the fender secured thereon is adjusted simultaneously with the adjustable bracket.

WILBUR J. COULTAS.